United States Patent [19]

Scheibel et al.

[11] Patent Number: 4,968,451

[45] Date of Patent: Nov. 6, 1990

[54] SOIL RELEASE AGENTS HAVING ALLYL-DERIVED SULFONATED END CAPS

[75] Inventors: Jeffrey J. Scheibel; Eugene P. Gosselink, both of Cincinnati, Ohio

[73] Assignee: The Procter & Gamble Company, Cincinnati, Ohio

[21] Appl. No.: 474,709

[22] Filed: Jan. 29, 1990

Related U.S. Application Data

[63] Continuation of Ser. No. 237,598, Aug. 26, 1988, abandoned.

[51] Int. Cl.$^5$ .................. C07C 309/05; C08G 63/68; C11D 3/37
[52] U.S. Cl. .................. 252/549; 252/174.19; 252/539; 252/558; 252/DIG. 15
[58] Field of Search .......................... 252/549

[56] References Cited

U.S. PATENT DOCUMENTS

| | | | |
|---|---|---|---|
| 3,821,169 | 6/1974 | Duddey et al. | 528/293 |
| 4,156,073 | 5/1979 | Login | 528/295 |
| 4,267,123 | 5/1981 | Chew et al. | 260/501.12 |
| 4,299,743 | 11/1981 | Pierce et al. | 524/590 |
| 4,303,774 | 12/1981 | Nachtkamp et al. | 528/71 |
| 4,588,534 | 5/1986 | Shepherd, Jr. et al. | 260/513 R |
| 4,598,141 | 7/1986 | Fock et al. | 528/293 |
| 4,687,602 | 8/1987 | Ballschuh et al. | 260/501.12 |
| 4,721,580 | 1/1988 | Gosselink | 252/90 |

FOREIGN PATENT DOCUMENTS

| | | |
|---|---|---|
| 155710 | 9/1985 | European Pat. Off. |
| 180356 | 5/1986 | European Pat. Off. |
| 1475798 | 6/1977 | United Kingdom |

OTHER PUBLICATIONS

S. C. Bright, C. E. Stubbs and L. Thompson, J. Appl. Chem. Biotechnol, 1975, vol. 25, pp. 901–912.

Norton et al., J. Org. Chem., vol. 33, No. 11, pp. 4158–4165 (1967).

*Primary Examiner*—A. Lionel Clingman
*Attorney, Agent, or Firm*—Leonard W. Lewis; Jerry J. Yetter

[57] ABSTRACT

The present invention relates to novel soil release agents, which are particular sulfonated linear terephthalate ester oligomers (S.T.E. oligomers). The S.T.E. oligomers are especially suitable for formulation into laundry products such as laundry detergents or fabric conditioners. Thus formulated, they provide effective soil release treatments for fabrics laundered in the home. The S.T.E. oligomers can be made by radical-initiated sulfonation of an allyl end-capped oligomeric ester precursor, and in the preferred embodiments, comprise a high proportion of disulfonate or sulfinate-sulfonate end-capping groups.

17 Claims, No Drawings

SOIL RELEASE AGENTS HAVING ALLYL-DERIVED SULFONATED END CAPS

This is a continuation of application Ser. No. 07/237,598, filed on Aug. 26, 1988.

TECHNICAL FIELD

The present invention relates to novel soil release agents, which are ester oligomers of a kind which may readily be formulated into laundry products such as laundry detergents or fabric conditioners. Thus formulated, they are suitable for use in a home laundry operation. Effective, renewable soil release treatment of fabrics is provided.

Preparation of the novel soil release agents involves ester chemistry and, in the preferred embodiments, radical-initiated sulfonation chemistry designed to produce substantially linear, relatively low molecular weight terephthalate ester oligomers having end-capping moieties each comprising disulfonate or sulfinate-sulfonate.

BACKGROUND OF THE INVENTION

A substantial proportion of synthetic fabrics now in use are copolymers of ethylene glycol and terephthalic acid, sold under trade names which include DACRON, FORTREL and BLUE C POLYESTER. The removal of oily soil and oily stains, which are hydrophobic, from the surfaces of such fabrics, which are likewise hydrophobic in character, is well recognized to be technically difficult to achieve using laundry compositions of the type most generally accessible to consumers.

It has been recognized in the art that the provision of substances which attach to the surfaces of polyester fabrics and render them more hydrophilic in character is helpful in achieving improved oily soil and oily stain release from such fabrics. Substances which have been used in consumer products as soil release agents are generally copolymers of moderately high (e.g., 40,000 to 50,000) molecular weight, containing ethylene terephthalate segments randomly interspersed with polyethylene glycol segments. See, for example, U.S. Pat. No. 3,962,152, Nicol et al, issued June 8, 1976; a soil release polyester of this type, commercially known as MILEASE T, is further disclosed in U.S. Pat. No. 4,116,885, Derstadt et al, issued Sept. 7, 1978; other commercial variants are PERMALOSE and ZELCON (see Canadian Pat. No. 1,100,262, Becker et al, issued May 5, 1981 and U.S. Pat. No. 4,238,531, Rudy et al, issued Dec. 9, 1980).

The development of new soil release agents delivering technically outstanding soil release performance cost-effectively in consumer laundering and fabric care compositions is not straightforward. To be particularly useful, efficient adsorption and surface coverage of polyester fabric surfaces by the soil release agent must occur, with minimum interference from the product matrix which is being used as a vehicle to convey the soil o release agent to the fabric surface. Matrix interferences, when they occur, not only decrease the effectiveness of the soil release agent, but also reduce the cleaning, softening and/or antistatic benefits of other ingredients which may also be present in the product. Formulability of the soil release agent is also a major consideration, since the limited solubility and/or dispersibility of art-taught polyesters frequently imposes serious constraints on the range of formulations into which the soil release agent may stably be introduced. Such challenges are generally absent from compositions used in industrial textile o treatments, but are well-known to manufacturers of fully-formulated consumer products.

Various materials, especially the oligomeric anionic endcapped esters described by Gosselink in U.S. Pat. No. 4,721,580, issued Jan. 26, 1988, have been disclosed for use as soil release agents. Thus, useful and relevant background can be drawn from a reading of polyester chemistry, for example as summarized in the background portion of the Gosselink patent.

Gosselink goes on to describe particular oligomeric esters which are useful as soil release agents in laundry products. The ester compositions provided by Gosselink encompass substantially linear ester oligomers which have one or two monosulfonated end-caps, as illustrated by $Q''-\{-Z-O-R-O\}_y H$ and $\{Q-Z-O-R-O\}_x Z-Q'$ respectively, wherein Z is terephthaloyl, R is 1,2-propylene and each of the groups Q, Q' and Q'' is $MO_3S(L)(CH_2CH_2O)$— or $MO_3S(CH_2CH_2O)$—. L is $C_1$–$C_6$ alkoxy, M is a metal cation and x and y are consistent with oligomers of low molecular weight.

The syntheses of the Gosselink esters are likely to be rather expensive, at least inasmuch as those specifically illustrated rely on reactive chlorinated starting materials known to be corrosive and difficult to handle.

Gosselink has also provided other oligomeric ester soil release agents; see, for example, U.S. Pat. Nos. 4,702,857, issued Oct. 27, 1987; 4,711,730, issued Dec. 8, 1987; and 4,713,194, issued Feb. 15, 1987. These soil release agents, like those of the '580 patent, contain terephthalate, but have o nonionic, i.e., uncharged, capping groups.

Utility of the foregoing oligomeric ester materials as soil release agents in laundry products notwithstanding, the search for improved soil release agents has continued, in view of an ongoing need to further improve the economics, soil release properties and formulability of the soil release agents in specific laundry product matrices.

Soil release agents having allyl-derived or methallyl-derived end-caps are not apparently known in the art. At the outset of the work now described, such incorporation appeared, in chemical terms, to represent a difficult goal. Thus, sulfonating a simple olefin, having only one reactive group, and sulfonating an ester oligomer, containing several different, potentially reactive groups, are two very different matters. Also, it was unclear whether any soil release benefit might result, or whether instead the sulfonated ester would then be less effective (e.g., overly soluble and not inclined to deposit on fabrics).

In view of the foregoing, it would be desirable to provide improved soil-release ester oligomers.

It is an object of the present invention to provide such materials, structurally altered especially in the composition of the end-caps.

It is a further object of the invention to provide useful oligomeric ester compositions comprising the novel oligomers in admixture with other soil-release effective esters, such as the monosulfonate end-capped esters specifically disclosed by Gosselink or obvious variants thereof.

It is yet another object of the invention to provide useful

BACKGROUND ART

S. C. Bright, C. E. Stubbs and L. Thompson, J. Appl. Chem. Biotechnol., 1975, Vol. 25, pages 901-912, disclose radical-initiated sulfonation of ether-bond free linear olefins, i.e., olefinic hydrocarbons such as 1-dodecene, to simultaneously form alkane monosulfonates, alkane sulfinate-sulfonates and alkane disulfonates. Sodium metabisulfite is reacted with the linear olefin in a mixed solvent system comprising water and isopropanol. The alkane sulfinate-sulfonate is referred to as undesirable and it is stated that the level of this material can be controlled by adjusting the pH of the reaction. It is further disclosed that "in practice, the rate of sulfitation decreases rapidly as the sulfitation pH rises above 7.0." Also, "the solubility of the olefin in &he aqueous isopropanol is adversely affected by the increasing levels of sodium sulfite present" and "sodium sulfite tends to cause separation of sulfitation reaction mixtures into an aqueous phase containing sulfite and bisulfite and an isopropanol phase containing the olefin".

U.S. Pat. No. 4,588,534, Shepherd, Jr. et al, issued May 13, 1986, discloses an ether sulfinate-sulfonate or disulfonate having the formula $ROCH_2C(SO_2M)(Z)CH_2SO_3M$ or $ROCH_2C(SO_3M)(Z)CH_2SO_3M$, or a mixture of $ROCH_2CH(Z)CH_2SO_3M$ and $ROCH_2C(SO_2M)(Z)CH_2SO_3M$, or a mixture of $ROCH_2CH(Z)CH_2SO_3M$ and $ROCH_2C(SO_3M)(Z)CH_2SO_3M$; wherein R is a hydrocarbon group having from about 6 to about 24 carbon atoms, Z is hydrogen or a methyl group and M is an alkali metal, alkylammonium or ammonium cation. The compositions are useful as a foaming agent and enhanced oil recovery surfactant. The most preferred compositions are prepared by reacting a linear primary alcohol with a chlorinated compound, specifically allyl chloride, to form an alkyl allyl ether; this ether is then reacted with sulfur dioxide and sodium hydroxide in a solvent such as isopropyl alcohol/water in the presence of suitable catalyst such as t-butyl perbenzoate, to form a mixture of alkyl allyl ether sulfinates and sulfonates.

U.S. Pat. No. 4,303,774, Nachtkamp et al, issued Dec. 1, 1981, is directed to the manufacture of improved polyurethane elastomers which are soluble or dispersible in water, have a substantially linear molecular structure and contain both ethylene oxide units (built into polyether chains) and sulfonate groups. These elastomers contain from about 0.5%-20% by weight of ethylene oxide-derived units arranged within polyether chains and from about 0.1-25 milliequivalents, per 100 g of solids content, of sulfonate groups of the formula —$SO_3$— in the form of structural units corresponding to the following formula: —O—X—R, arranged in end positions and/or side chains. In the Nachtkamp et al formulae, X is a polyalkylene oxide chain having from 5-90 chain members, at least about 40% of which are ethylene oxide units; and R is a monovalent hydrocarbon group having from 3-18 carbon atoms and containing at least one sulfonate group $SO_3$—. Examples 1 and 2 show preparation of a polyether monohydric alcohol containing sulfonate groups derived from allyl alcohol; other Examples include Example 3, wherein under particular conditions and in particular proportions, the following are reacted: polyester of adipic acid and butanediol, polyether monohydric alcohol containing sulfonate groups, trimethylol propane, isophorone diisocyanate, acetone, isophorone diamine, hydrazine hydrate and water.

Norton et al, J. Org. Chem., Vol 33, No. 11, pp 4158-4165 (1967) disclose extensive studies of solvent, catalyst cation and catalyst anion effects in the ion catalysis of sulfite radical-ion addition to olefins.

Fock et al, U.S. Pat. No. 4,598,141, issued July 1, 1986, describe a process for the preparation of polyesters with improved dye affinity. This involves reacting a dicarboxylic acid with a mixture of diols. The diol mixture used comprises a major portion of an alkylene glycol and a minor portion of a polyalkylene ether having the formula $R^1CH_2O—(C_2H_4O—)_n(C_3H_7O—)_mCH_2CHR_3CH_2—SO_3X$ wherein $R^1$ is $HO—CH_2CH(OH)—$ or $HOH_2CC(R_2)(CH_2OH)—$ wherein $R^2$ is methyl, ethyl or propyl; $R^3$ is H— or methyl; X is H—, alkali or ammonium ion, n is from 0 to 100, m is from 0 to 50 and n+m is not less than 1. To prepare the sulfonated compound, radical addition $HSO_3X$ in the presence of catalysts to compounds having the following formula: $R^1CH_2O—(C_2H_4O)_n(C_3H_7O—)_mCH_2CHR_3=CH_2$ is disclosed.

Pierce et al, U.S. Pat. No. 4,299,743, issued Nov. 10, 1981, describe a linear or branched polymer, containing a plurality of organic sulfonate-containing groups, which is capable of being dissolved or dispersed in a liquid medium. The polymer is useful as a pigment dispersant and as film-forming polymer in coating compositions, and invariably contains at least one o sulfonate-containing group: —$C(O)—C(R^1)HC(R_2)(R_3)(SO_3)$—M+ wherein $R^1$, $R^2$ and $R^3$ are each individually hydrogen or a monovalent organic group having a molecular weight in the range from 15 to about 250; and M+ is a monovalent cation or a monovalent fractional part of a polyvalent cation, which is associated with the —$SO_3$— portion of the organic sulfonate group. The sulfonation i% introduced by post-sulfonating an ethylenically unsaturated preformed intermediate polymer using bisulfite salt, metabisulfite salt or mixtures or precursors of such salts. The preformed intermediate polymer has numerous illustrations, including polyesters derived from propylene glycol or prepared using dibutyl tin oxide or similar catalysts.

Schmitt, EP-A No. 155,710, published September 25, 1985, discloses alkyoxypolyethoxypropane sulfonates of the general formula $RY(C_2H_4O)_xCH_2CH_2CH_2SO_3Na$ in which R is alkyl or alkaryl, Y is O or S and x is from 0 to 20. These compositions are prepared by a two-stage procedure in which the polyethoxylated alcohol or thiol $RY(C_2H_4O)xH$ is reacted with allyl halide or tosylate in the presence of strong aqueous NaOH and some final product as phase transfer agent; the resulting allyl ether intermediate is sulfonated in situ with bisulfite.

Hodgson et al, EP-A No. 180,356, published May 7, 1986, describes preparation of alkyl, aryl, or alkylaryloxy halides by reacting the corresponding alkoxy alcohol with a halogenating agent, e.g., thionyl chloride, in the presence of a quaternary ammonium compound as catalyst. The catalyzed reaction apparently improves yield and reduces the tendency of the polyoxyalkylene chain to cleave.

Ballschuh et al, U.S. Pat. No. 4,687,602, issued Aug. 18, 1987, discloses sulfonates, sulfinates, disulfonates and mixed sulfinate-sulfonates derived by reacting allyl amine derivatives, such as dimethylallylamine hydrochloride, with $NaHSO_3$ at pH range 2-4, in the presence of peroxodisulfate. The reaction is initiated by $FeSO_4$, resulting in a high proportion of sulfinate-sulfonate, which can in turn be converted to the disulfonate using hydrogen peroxide. The products are characterized as betaine-type surfactants. o Duddey et al, U.S. Pat. No. 3,821,169, issued June 28, 1974, disclose a method for preparing cationically dyeable highly polymeric linear polyester and copolyester resins which comprises adding to a multi-step polyester or copolyester forming process at least one compound selected from the group consisting of hydroxyalkylene oxide and hydroxypoly(alkylene oxide) derivatives of metallic salts of isethionic acid.

Login, U.S. Pat. No. 4,156,073, issued May 22, 1979, discloses branched (e.g., prepared in the presence of trimellitic anhydride) water-dispersible polyester size compositions which incorporate reaction product of an aromatic polycarboxylic acid anhydride and an aliphatic or cycloaliphatic hydroxysulfonic acid alkali metal salt.

Although the soil-release agents described herein are not classical "polyesters" in the sense of having the structure of ester high polymers, resins or fibers, they can be termed polyesters in the somewhat more restricted sense that a plurality of ester-bond interconnected groups is present. Inasmuch as the above-identified references disclose various well-established aspects of making polyesters, on one hand, or certain sulfonated or sulfinated materials, on the other, their disclosures are incorporated herein by reference.

SUMMARY OF THE INVENTION

In its preferred embodiments, the present invention provides novel sulfonated terephthalate ester oligomers which are useful soil release agents for use in laundry products. The esters generally contain a high proportion of free-radical-sulfonated-allyl or free-radical-sulfonated-methallyl end-caps. The preferred allyl-derived end-caps are:

| Abbreviation | Formula | Name (Typically derived from) |
|---|---|---|
| ($CAP_a$) | $-CH_2CH-CH_2$ <br> \| \ \ \ \ \ \| <br> $SO_2^-$ \ $SO_3^-$ | sulfinate-sulfonate (ALLYL) {note: sulfonate is typically associated with cation such as $Na^+$; sulfinate is typically associated with cation such as $H^+$ or $Na^+$} |
| and | | |
| ($CAP_b$) | $-CH_2CH-CH_2$ <br> \| \ \ \ \ \ \| <br> $SO_3^-$ \ $SO_3^-$ | disulfonate (ALLYL) {note: sulfonate is typically associated with cation such as $Na^+$}. |

In the above, the disulfonate end-cap (CAPb) is especially preferred. In general, varying proportions of the following monosulfonate end-cap can also be present:

| Abbreviation | Formula | Name (Typically derived from) |
|---|---|---|
| ($CAP_c$) | $-CH_2CH_2CH_2$ <br> \| <br> $SO_3^-$ | monosulfonate (ALLYL) {note: typically associated with cation such as $Na^+$} |

It is part of the instant invention to provide methods for maximizing the relative proportions of (CAPa) and (CAPb) substituted terephthalate esters relative to (CAPc) substituted terephthalate esters.

Allyl groups, which are present in the esters prior to sulfonation, are represented herein as follows:

| Abbreviation | Formula | Name (Typically derived from) |
|---|---|---|
| (ALLYL) | $-CH_2-CH=CH_2$ | allyl (allyl alcohol) |

The methallyl homoloq, typically derived from methallyl alcohol, is also within the scope of the invention; in contrast, higher olefins, higher branched olefins and the like are unsuitably hydrophobic.

The terephthalate ester oligomers herein have substantially linear backbones; thus they do not, in general, include branching or crosslinking tri- or polyvalent monomer groups such as tri-, tetra- or poly-carboxylic acid monomer groups, or tri-, tetra- or polyhydric alcohol monomer groups.

In the preferred embodiment, the linear backbone of the sulfonated, end-capped terephthalate esters of the invention is comprised of alternating groups of the formulae:

| Abbreviation | Formula | Name (Typically derived from) |
|---|---|---|
| (T) | $-C(C_6H_4)C-$ with two $\|\|O$ above | terephthaloyl (dimethylterephthalate) |
| and | | |
| (PG) | $-OCH(CH_3)CH_2O-$ or $-OCH_2CH(CH_3)O-$ | oxypropyleneoxy (1,2-propylene glycol) |

Furthermore, the sulfonated ester oligomers will generally contain nonionic hydrophile units, especially:

| Abbreviation | Formula | Name (Typically derived from) |
|---|---|---|
| ($E_n$) | $-O(CH_2CH_2O)_{n-1}CH_2C-H_2O-$ | poly(oxyethylene)-oxy (ethylene oxide) |

Importantly, in the preferred embodiment, such nonionic hydrophile units are found substantially situated in particular positions between the end-caps and the backbone, rather than interrupting the backbone structure. Thus, at the molecular level, the following are illustrative of the most highly preferred structures:

$(CAP_a)-(E_n)-(T)-(PG)-(T)-(PG)-(T)-(PG)-(T)-(E_n)-(CAP_a)$
$(CAP_a)-(E_n)-(T)-(PG)-(T)-(PG)-(T)-(PG)-(T)-(E_n)-(CAP_b)$

-continued (CAP$_b$)—(E$_n$)—(T)—(PG)—(T)—(PG)—(T)—(PG)—(T)—(E$_n$)—(CAP$_b$)

All of the foregoing structures correspond with sulfonated esters which contain a total of four sulfonate or sulfinate groups; in contrast, the following structures, having only three sulfonate or sulfinate groups in total, are less preferred:

(CAP$_a$)—(E$_n$)—(T)—(PG)—(T)—(PG)—(T)—(PG)—(T)—(E$_n$)—(CAP$_c$)

(CAP$_b$)—(E$_n$)—(T)—(PG)—(T)—(PG)—(T)—(PG)—(T)—(E$_n$)—(CAP$_c$)

Also, least desirably as noted supra, material having only monosulfonate terminal units can be present:

(CAP$_c$)—(E$_n$)—(T)—(PG)—(T)—(PG)—(T)—(PG)—(T)—(E$_n$)—(CAP$_c$)

Note that the backbone, which in the above-illustrated structures is given by: —(T)—(PG)—(T)—(PG)—(T)—(PG)—(T)—, can have varying lengths. The most highly preferred average backbone length, in terms of the number of terephthaloyl repeat units (T), is in the range from about 1 to about 7. In referring to such an average backbone composition hereinafter, the abbreviation —{B}— is used.

More generally, the backbone can incorporate repeat units such as the following, to a limited extent:

| Abbreviation | Formula | Name (Typically derived from) |
|---|---|---|
| (EG) and (A$_n'$) | —OCH$_2$CH$_2$O— | oxyethyleneoxy (ethylene glycol) optional nonionic hydrophile, typically similar to, or identical with (E$_n$); | wherein (EG) exemplifies a repeat unit derived from a diol which is less preferred than 1,2-propylene glycol. Thus, (EG) can partially replace (PG) backbone repeat units. (A$_n'$) is used herein to represent nonionic hydrophile units, of a kind which can optionally interrupt the ester backbone at random, leading to structures such as:

(CAP$_a$)—(E$_n$)'(B)—(A$_n'$)—(B)—(E$_n$)—(CAP$_a$)

(CAP$_b$)—(E$_n$)—(B)—(A$_n'$)—(B)—(E$_n$)—(CAP$_b$)

As noted supra, such backbone interruption is preferably minimal.

The sulfonated ester oligomers are typically water-soluble or water-dispersible. Whatever their precise solubility in pure water, they are found to formulate well into laundry detergent compositions, with particularly good formulability being associated with the (CAP$_a$) and (CAP$_b$) substituted esters. Furthermore, the improved formulability does not apparently detrimentally influence the action of the sulfonated ester oligomers as soil-release agents.

Methods of making the novel ester compositions are also provided, particularly effective being a radical-initiated sulfonation of a preformed, allyl-group end-capped, terephthalate ester oligomer precursor (hereinafter "A.T.E"). Using the above-introduced abbreviations, this useful precursor is illustrated at the molecular level by structures such as: (ALLYL)—(E$_n$)—(B)—(E$_n$)—(ALLYL) (highly preferred) or, less desirably, (AL-LYL)—(E$_n$)—(B)—(A$_n$)—{B}—(E$_n$) (ALLYL). The conditions used for preparing the A.T.E, as further illustrated in the preferred embodiments hereinafter, are consistent with minimizing the relative proportion of the (A$_n$)-containing material.

DETAILED DESCRIPTION OF THE INVENTION

The present invention encompasses sulfonated oligomeric ester compositions adapted for use as soil release agents in laundry products such as detergents or fabric conditioners. o The compositions of the invention can be described in terms of the particularly sulfonated product of a specific, preformed, substantially linear ester oligomer, identified simply as "A.T.E.", . The terminal units of the A.T.E. comprise a high proportion of allyl or methallyl end-caps and the repeat units in the backbone comprise terephthaloyl and low molecular weight diol-dirived units.

Surprisingly, there does not appear to be any specific disclosure in the literature of this type of material, the composition of which, per mole, is more specifically described as o follows.

The A.T.E. composition comprises (a), terminal units; (b), nonionic hydrophile units; (c), repeat units of the aryldicarbonyl type; and (d), repeat units of the low molecular weight diol type.

More specifically, the A.T.E. composition comprises from about 1 mole to about 2 moles, per mole of the composition, of terminal units derived from a low molecular weight olefinically unsaturated component. Preferably, this component is selected from the group consisting of allyl alcohol and methallyl alcohol. Most preferably, substantially all (i.e., about 2 moles) of the terminal units are allyl end-caps.

The A.T.E. composition comprises from about 1 mole to about 4 moles, more preferably from about 1.5 moles to about 3 moles, most preferably about 2 moles per mole of the composition, of nonionic hydrophile units. These units are derived from an ether component. The ether component is typically comprised of from about 50% to 100% ethylene oxide. In the preferred embodiment, the ether component is comprised of from about 80% to 100% ethylene oxide; most preferably, the ether component consists essentially of ethylene oxide, i.e, it is substantially poly(oxyethylene)oxy. Whatever its derivation, non- ethylene oxide material in the ether component consists essentially of C, H and O; it can, for example, include propylene oxide or other alkylene oxides provided that the resulting polyether remains hydrophilic. The nonionic hydrophile units have a degree of polymerization in the range from about 4 to about 30, more preferably from about 8 to about 20. As noted supra, the nonionic hydrophilic units can in general terms either interrupt the backbone structure or be situated between the backbone and the allyl terminal units; it is highly preferred that the latter be the case.

The A.T.E. composition comprises from about 1.1 moles to about 20 moles, more preferably from about 1.5 to about 10 moles, most preferably from about 2 moles to about 7 moles, per mole of he composition, of repeat units derived from an aryldicarbonyl component. The aryldicarbonyl component is comprised of from about 50% to 100%, more preferably from about 80% to 100% dimethylterephthalate. Most preferably, this component consists essentially of dimethyl terephthalate and the resulting aryldicarbonyl repeat units are substantially terephthaloyl. The essential terephthaloyl units can alternatively be made from any of terephthalic acid, bis-(2-hydroxy-ethyl)terephthalate and bis-(2-hydroxypropyl)terephthalate. The latter two sources of terephthaloyl units, of course, provide at the same time repeat units of type (d), which are separately accounted for below. If present, repeat units of the aryldicarbonyl type which are not terephthaloyl repeat units, are based on known aryldicarbonyl materials and consist essentially of C, H and O; such aryldicarbonyl repeat units are o illustrated by isophthaloyl and phthaloyl.

Finally in accounting for the composition, the A.T.E. comprises from about 0.1 moles to about 19 moles, more preferably from about 0.5 moles to about 9 moles, most preferably from about 1 mole to about 6 moles, of repeat units derived from a diol component selected from the group consisting of $C_2$—, $C_3$— and $C_4$ diols (i.e., $C_2$—, $C_3$— and $C_4$ lycols). This component is preferably selected from ethylene glycol, 1,2-propylene glycol, and mixtures of the two. Most preferably, this component consists essentially of 1,2-propylene glycol; the corresponding repeat units are oxypropyleneoxy repeat units.

The sulfonated terephthalate ester oligomer compositions of the invention, hereinafter "S.T.E.", comprise (a), terminal units; (b), nonionic hydrophile units; (c), repeat units of the aryldicarbonyl type; (d), repeat units of the low molecular weight diol type; and (e), sulfinate groups, sulfonate groups or mixtures thereof.

As compared with the terminal units of the A.T.E., which are olefinically unsaturated, preferably allyl terminal units, the terminal units (a) of the S.T.E. are substantially saturated. The sulfinate or sulfonate groups (e) are covalently attached to the terminal units, forming the structures identified hereinabove in summary as ($CAP_a$), ($CAP_b$) or ($CAP_c$).

The extent of solfonation is typically from about 1 mole to about 4 moles, and the S.T.E. includes compounds containing from about 3 moles to about 4 moles of —$SO_xM$ groups, wherein x is 2 (sulfinate) or 3 (sulfonate). The sulfinate or sulfonate groups o are derived from a bisulfite component. The latter is preferably selected from the group consisting of $HSO_3M$ wherein M is a conventional water-soluble cation such as sodium, potassium or a stable, water-dissociable organic cation. The composition of the S.T.E., in terms of the other units present (namely (b), nonionic hydrophile units; (c), repeat units of the aryldicarbonyl type; and (d), repeat units of the low molecular weight diol type) is in accordance with their being derived from the A.T.E.

In a preferred embodiment of the invention, the backbone of the S.T.E. consists essentially of terephthaloyl repeat units which alternate with oxyalkyleneoxy repeat units selected from oxyethyleneoxy repeat units and oxy-1,2-propyleneoxy repeat units wherein the oxyethyleneoxy: oxy-1,2-propyleneoxy mole ratio is in the range from 0:1 to about 0.9:0.1, more preferably from about 0:1 to about 0.4:0.6; most preferably about 0:1 (i.e., substantially oxy-1,2-propyleneoxy). To this backbone are attached, at each end, hydrophilic repeat units consisting essentially of poly(oxyethylene)oxy units (polymerized ethylene oxide) which have an average degree of polymerization of from about 4 to about 30, more preferably from about 8 to about 20. The poly(oxyethylene)oxy units are capped with the above-identified sulfonated allyl terminal units; these can have any of the formulae ($CAP_a$), $CAP_b$) and ($CAP_c$) summarized above; most preferably, the relative proportion of ($CAP_a$) and/or $CAP_b$) is high in comparison with that of ($CAP_c$).

Another preferred embodiment of the invention illustrates the high relative proportion of the sulfonated end-caps of the S.T.E. in relation to the total of other units present. In this embodiment, the invention encompasses the sodium salt form of a sulfonated oligomeric ester (S.T.E.) composition consisting essentially of:

(i) a substantially linear oligomeric ester backbone, which is comprised of from about 85% to about 100% by weight of terephthaloyl and oxy-1,2-propyleneoxy repeat units; and (ii) terminal moieties covalently attached to said backbone; wherein said terminal moieties are comprised of from about 70% to 100% by weight of moieties selected from the group consisting of —($E_n$)($CAP_a$), —($E_n$)$CAP_b$) and —($E_n$)($CAP_c$) (wherein the abbreviations are as identified in summary above); wherein n represents an average degree of polymerization, in the range from about 8 to about 20; and wherein said composition, the percentage by weight of the end-cap moieties ($CAP_a$), $CAP_b$) and ($CAP_c$) is in the range from about 5% to about 40%, more preferably from about 10% to about 30%.

In the above-illustrated embodiment, the mole ratio of all the doubly sulfonated end-cap moieties, i.e., ($CAP_a$), $CAP_b$) or mixtures thereof, in relation to the singly sulfonated end-cap n moieties ($CAP_c$), ranges from about 1:5 to about 1:0, more preferably from about 2:1 to about 1:0, and includes materials at ratios of from about 5:1 to about 1:0.

The above-identified features of the S.T.E. are in accordance with the synthesis thereof, which in the preferred embodiment involves a particular ordered series of steps.

First, allyl alcohol ethoxylate or methallyl alcohol ethoxylate is made or obtained from commercial sources. The is well-known; note however that the allyl or methallyl alcohol ethoxylate should not be made without due care, and that if the samples are commercially obtained, they should be of good purity. Unacceptable levels of impurities such as vinyl derivatives and/or polyethylene glycol can easily result from an improperly controlled synthesis. Polyethylene glycol levels in particular should be controlled, since this dihydric, relatively high molecular weight alcohol can act as a source of units of the type identified as ($A_n$) in the foregoing discussion. For this reason, synthesis of suitable allyl alcohol ethoxylate is further illustrated in detail in the Examples hereinafter.

The allyl alcohol ethoxylate is reacted under ester-making conditions. Typically a two-part procedure is used, involving first, transesterification under an inert atmosphere; and second, oligomerization at reduced pressure, of a mixture comprising the allyl alcohol ethoxylate and suitable chemical sources of the aryldicarbonyl repeat units and the low molecular weight diol repeat which will react to form the ester backbone —{B}— (e.g., dimethyl terephthalate and 1,2-propylene glycol). The procedure forms the above-identified allyl end-capped oligomeric ester (A.T.E.).

In more detail, the transesterification stage typically involves reacting the calculated proportions of allyl alcohol ethoxylate and dimethylterephthalate, together with an excess (e.g., 50-100% molar excess beyond theoretical incorporated diol) of diol (e.g., 1,2-propylene glycol), in the presence of a conventional transesterification catalyst; methanol is removed by evaporation or distillation. Suitable transesterification catalysts include metal derivatives such those of zinc, titanium, antimony and tin; the oxides, alkoxides, carbonates, acetates, alkyl esters or alkyls can be used. Such catalysts are further illustrated by tetraisopropoxytitanium-(IV), n-butyl(trihydroxy)tin-(IV), and zinc acetate. The practitioner should note that particular care is taken (e.g., excluding air, mixing well to avoid hot-spots, and avoiding over-heating) to avoid undesired side-reactions of the rather reactive allyl groups.

The oligomerization stage involves further reacting the product of the transesterification stage, at an oligomerization temperature which is higher, and at an oligomerization pressure which is lower, than the temperature and pressure used in the transesterification stage. Typically, a small amount of methanol, and the excess diol, are removed under the reduced pressures. Typically, no separate oligomerization catalyst is needed.

A radical-initiated olefin sulfonation procedure is now carried out. This typically involves reaction of the A.T.E. with o a source of bisulfite in the presence of water. The bisulfite can be derived from many alternative sources, such as $SO_2$ and base, metabisulfite salts, etc., and the cation is commonly sodium or potassium. The radical-initiated olefin sulfonation used herein is desirably a low-temperature procedure; aggressive conditions, especially heating under potentially hydrolyzing conditions, could otherwise tend to decompose the A.T.E. or the product S.T.E. Thus, it is highly preferred to use a low-temperature (0° C.-100° C.) free radical initiator.

In general, the radical initiator used herein is water o soluble or alcohol-water soluble. The preferred initiators are azo initiators or redox initiators. Such initiators are well known in the art. For the purposes of the instant invention, redox initiators are especially preferred since their use is associated with much shorter reaction times and much lower reaction temperatures relative to any other known initiators.

Suitable azo initiators are available in commerce under the trademarks of various manufacturers (WAKO, DuPONT, ALDRICH) and include materials chemically identified as 2,2'-azobis(N,N'-dimethyleneisobutyramidine)dihydrochloride, 2,2'-azobis(2-amidinoo propane)dihydrochloride, 4,4'-azobis(4-cyanopentanoic acid), and 2,2'-azobis(2-methyl-N-(1,1-bis{hydroxymethyl}ethyl)propionamide).

When using an azo initiator, the free-radical initiated olefin sulfonation procedure is preferably carried out at temperatures in the range from about 20° C. to about 100° C., more preferably from about 40° C. to about 65° C.; pressure is in the range from about 0.5 atm. to about 3.0 atm., more preferably from 1 atm. to about 1.5 atm., and a reaction time in the range from about 5 hrs. to about 90 hrs., more preferably from about 10 hrs. to about 30 hrs., is used.

Redox initiator systems are illustrated by persulfate / $Cu^+$ and persulfate in combination with a water-soluble metal salt of $Fe^{2+}$, $Mn^{2+}$ or $Co^{2+}$.

When using a redox initiator, the radical initiated olefin sulfonation procedure is preferably carried out at temperatures in the range from about 0° C. to about 40° C., and a reaction time of as little as from about 0.1 hrs. to about 24 hrs. can be used. More preferably, the sulfonation temperature is in the range from about 10° C. to about 30° C., and the sulfonation time is from about 0.5 hrs. to about 10 hrs. Pressure is in the range from about 0.5 atm. to about 3 atm., more preferably from about 1 atm. to about 1.5 atm.

An important particularity of the sulfonation stage is &he need to keep the reactants in good contact. It should be appreciated that unless care is taken (temperature control, mixing, use of alcohol-water solvents) there will be a tendency for the allyl end-capped A.T.E. ester to separate from the aqueous sulfonation reagent, resulting in poorer sulfonation yields.

As noted in the summary, it is possible to vary the proportions of ($CAP_a$), ($CAP_b$) and ($CAP_c$) end-caps in the sulfonated esters of the invention. Adjustment of the pH used in the aboveoutlined sulfonation stage to lower pH values, and/or use of excess bisulfite, tends to favor higher levels of ($CAP_a$) (sulfinate-sulfonate); in contrast at higher pH values, especially when little or no bisulfite excess is present, ($CAP_c$) (monosulfonate) predominates. In connection with olefin sulfonation pH o effects, see the disclosures of Bright, Stubbs et al and Shepherd, referred to supra and incorporated herein by reference. When it is desired to maximize the proportion of the preferred $CAP_b$-containing esters, an optional hydrogen peroxide oxidation step, carried out after the sulfonation reaction, will indeed successfully convert ($CAP_a$) to $CAP_b$. If such an oxidation step is carried out, the peroxide is in dilute aqueous form, and is typically added at ambient temperature with stirring.

In light of the above, the S.T.E., in another preferred embodiment of the invention is the product of a process comprising, in sequence, the following ester-bond forming procedure and radical-initiated sulfonation procedure:

Ester-bond-forming procedure: a transesterification step, comprising reacting a mixture of (I) about 2 moles of allyl alcohol ethoxylated to an average degree of polymerization of from about 4 to about 30 (more preferably, about 8 to about 20); and (II) from about 2 to about 7 moles of dimethyl terephthalate; and (III) from about 2 moles to about 14 moles of diol ( e.g., 1,2-propylene glycol or mixture thereof with ethylene glycol provided that the mole fraction of ethylene glycol does not exceed about 0.4);(note that this represents an excess over what will ultimately be incorporated into the composition).

The transesterification step is carried out in the presence of a conventional transesterification catalyst. The transesterification temperature is in the range from about 120° C. to about 250° C. (more preferably, about 160° C. to about 230° C.).

The transesterification pressure is in the range from about 0.75 atm. to about 3 atm., where 1 atm. 760 mmHg. More preferably, the transesterification pressure is in the range from about 1 atm. to about 2 atm. The transesterification time is from about 2 hrs. to about 60 hrs., more preferably from about 5 to about 25 hrs.

To complete the ester-bond forming procedure, the transesterification step is followed by an oligomerization step. The latter involves continuing to react the above-formed mixture under the following conditions: oligomerization temperature: in the range from about 170° C. to about 250° C., more preferably from about 180° C. to about 220° C.; oligomerization pressure: in the range from about $1 \times 10^{-6}$ atm. to about 0.5 atm., more preferably about $1 \times 10^{-4}$ atm. to about 0.05 atm.;

and oligomerization time: from about 2 hrs. to about 60 hrs., more preferably from about 5 hrs. to about 25 hrs.; whereby precursor allyl end-capped co-oligomeric ester (A.T.E.) is produced.

In a radical-initiated olefin sulfonation procedure, the A.T.E. material is now treated by at least one step of sulfonating the same in the presence of water, with a conventional bisulfite sulfonating reagent, in the presence of a low-temperature free-radical sulfonation initiator selected from azo initiators and redox (e.g., persulfate/metal cation) initiators; in this step, the reactants are effectively cocontacted (e.g., good mixing to make a homogeneous appearing aqueous reaction mixture) and the level of the conventional bisulfite sulfonating agent is from about 1 mole to about 4 moles, more preferably from about 3 moles to about 4 moles, per mole of said allyl end-capped co-oligomeric ester (A.T.E.); also, the following sulfonation conditions are respected: sulfonation temperature: in the range from about 0° C. to about 100° C.; sulfonation pressure: in the range from about 0.5 atm. to about 3 atm.; and sulfonation time: from about 0.1 hrs. to about 90 hrs.

After sulfonation, the sulfonated oligomeric ester composition (S.T.E.) of the invention, directly obtained in aqueous form (the water content is typically 80% or less), can be used without further purification as a soil release agent, e.g., by mixing into a liquid detergent composition. In the alternative, the very simple peroxide oxidation briefly referred to supra can first be carried out. If desired, the S.T.E. can be conventionally dried, or can be admixed with oligomeric ester soil release agents of types previously described in the art. The more conveniently handled aqueous form of the S.T.E. is a very well divided suspension, or, more typically, a clear solution. The associated advantage of not having to disperse the sulfonated esters prior to laundry product formulation is of considerable benefit to the formulator.

Despite the rather high solubility of the sulfonated oligomeric ester of the invention, it functions effectively as a soil release agent and thus meets the needs of the consumer as well as being convenient to the formulator.

In summary, the preferred S.T.E. has the particularity of being produced by an ester-bond forming procedure and a radical-initiated low temperature olefin sulfonation procedure, in that specific order. Quite differently from the process of Gosselink '580, the process arrives at a particular, terminally sulfonated substantially linear co-oligomeric ester composition without reliance upon a chlorinated compound and without reliance upon a procedure comprising the order of steps: sulfonation step, ethoxylation step. A finding of particular interest in terms of the synthesis of the ester compositions is that the preferred sulfonated oligomeric ester compositions can be made by aqueous radical-initiated sulfonation of the preformed allyl ester oligomer (A.T.E.), which has a backbone composition similar to, or identical with, that of the final sulfonated material, and which also includes the above-identified nonionic hydrophile units.

For additional detail concerning various low-level optional units which the esters of the invention can contain, as well as in terms of general synthetic methods, suitable starting-materials, and disclosure in connection with the preparation of laundry compositions, the practitioner is directed to the following Gosselink patents, incorporated herein by reference: U.S. Pat. No. 4,721,580, issued Jan. 26; U.S. Pat. No. 4,702,857, issued Oct. 27, 1987; U.S. Pat. No. 4,711,730, issued Dec. 8, 1987; and U.S. Pat. No. 4,713,194, issued Feb. 15, 1987.

In its detergent embodiments, the invention encompasses a laundry detergent or fabric conditioner composition comprising one or more conventional surface-active agents selected from conventional anionic, cationic or nonionic detersive surfactants, and conventional cationic fabric softeners; wherein the composition additionally comprises at least 0.05% by weight of the ester composition of the invention.

Liquid laundry detergent compositions, whether concentrated or dilute, are especially preferred. Such liquid detergent compositions can comprise from about 5% to about 40% of a conventional anionic surfactant and from about 0.05% to about 15% (dry basis, sodium salt form) of the sulfonated oligomeric ester composition (S.T.E.). In another embodiment, the liquid detergent compositions comprise from about 5% to about 40% of a conventional nonionic surfactant and from about 0.05% to about 15% (dry basis, sodium salt form) of the sulfonated oligomeric ester composition (S.T.E.).

Assisted by the desirable formulability characteristics of the S.T.E., substantially isotropic, heavy-duty built liquid laundry detergent compositions can readily be formulated comprising:

from about 10% to about 30% of a conventional alkylbenzene sulfonate anionic surfactant, on an acid basis;

from 0% to about 30% of one or more conventional cosurfactants selected from nonionic surfactants, cationic surfactants, zwitterionic surfactants and mixtures thereof;

from about 5% to about 30% of a conventional liquid detergent builder;

from about 0.01% to about 10% of the sulfonated oligomeric ester composition;

and from 0% to about 1% of a conventional proteolytic enzyme. In the above, proteolytic enzyme-containing built liquid laundry detergent compositions are especially superior. More recently developed enzymes, such as cellulase enzymes, are also compatible and can be formulated together with the S.T.E.

The invention is further illustrated by the following examples; percentages are by weight unless otherwise noted.

EXAMPLE 1

Step 1:

Preparation of allyl alcohol ethoxylate, having average degree of polymerization of about 15:

The following procedure is carried out in a fume hood; a trapping system is optionally used for additional reassurance in preventing escape of ethylene oxide vapors.

Allyl alcohol (8.72, 0.15 moles, 99+%, Aldrich) is placed in a suitably sized dry, three-necked round bottom flask fitted with magnetic stirrer, condenser and gas inlet and outlet. The flask and contents are cooled under a nitrogen atmosphere to about 0° C. Sodium metal shot (0.17, 0.0074 moles, Aldrich) is added slowly under a countercurrent of nitrogen. The mixture is stirred 1.5 hrs at about 0° C. Other strong bases can equally be used in substitution for the sodium. The temperature is allowed to rise to room temperature, at which stage essentially no sodium metal remains visible. The stirred mixture is heated to reflux, at which stage ethylene oxide gas is introduced into the solution through a glass tube at a rate at which it is mostly absorbed by the mixture rather than being wastefully expelled. Over a 2-hour period during which ethylene oxide addition is continued, the reflux temperature increases from about 110° C. to about 140° C. To avoid forming vinyl ether by-products, the temperature during this procedure is in any event never permitted to exceed about 150° C. Completion of the reaction to an average degree of polymerization of about 15 is confirmed by measuring volume uptake of ethylene oxide, measuring weight gain of the reaction mixture, or measuring both these quantities. The mixture is cooled to room temperature, and is treated with aqueous HCl (7.4 cm$^3$, IM, Fisher). The product at this stage is neutral. Substantially all water present is removed under aspirator vacuum. The product is filtered to remove sodium chloride. Yield is 77.8 (0.106 moles). The $^1$H n.m.r analysis is consistent with the above-identified degree of polymerization. Thus, integrals of the resonances in the following regions of the spectrum are obtained: integral of resonances at delta=5.18 ppm, $CH_2$=$CHCH_2O(CH_2CH_2O)_nH$;

integral A; and integral of resonances at delta=3.1 to 3.8 ppm, $CH_2$=$CHCH_2O(CH_2CH_2O)_nH$ and $CH_2$=$CHCH_2O$ $(CH_2CH_2O)_nH$; integral B. It is found that ($\frac{1}{2}$ integral B)/(integral A)=n=15.3.

In the $^1$H n.m.r data above and throughout the specification, chemical shifts, delta, are expressed in parts per million (ppm) referred to tetramethylsilane (TMS) (delta =0 ppm). In practice, a secondary reference of known chemical shift, such as hexadeuterodimethylsulfoxide (DMSO-d$_6$), can equally be used in the n.m.r experiments for convenience, and the TMS shifts are then obtained by difference.

Step 2:

Reaction of the product of step 1 with dimethyl terephthalate and 1,2-propylene glycol (two-stage procedure involving transesterification and oligomerization stages):

The product of step 1 (19.1, 0.026 moles) is placed in a dry, suitably sized round bottom flask equipped with magnetic stirrer, fitted with gas inlet, nitrogen bubbler and a modified Claisen head which supports a condenser and receiving flask. Dimethyl terephthalate (7.00, 0.0360 moles, Aldrich), 1,2-propylene glycol (3.40, 0.045 moles, Mallinckrodt, 98%) and a conventional transesterification catalyst such as FASCAT 4100 (TM) M&T Chemicals Inc., 0.03; 0.1% w/w, are added under a nitrogen blanket. The mixture is stirred and heated to about 40° C., taking about 15–30 minutes. This temperature is maintained for about 1 hour. The temperature is now raised to about 170° C. taking about 15–30 minutes. During the following 41 hours, the transesterification is continued and methanol together with some propylene glycol (total 2.8 ml., theory 2.9 ml) distil from the reaction mixture.

The apparatus is then cooled to room temperature and the reaction mixture is transferred to a Kugelrohr apparatus. The Kugelrohr is maintained under vacuum (ca. 1mmHg) and the temperature is raised to about 180°–190° C. over a 1 hr period. The reaction mixture is held at this temperature for a total oligomerization time of about 17 hrs. The product of the transesterification and oligomerization procedure is cooled to room temperature.

The reaction is demonstrated to be substantially complete by 70 MHz 13° C. n.m.r spectroscopy. Thus, the terminal alcohol-bearing carbon atom resonance (delta 60.7 ppm, $CH_2$=$CHCH_2O$ $(CH_2CH_2O)_x$—$ICH_2$-$CH_2OH$, reference =DMSO-d$_6$, 39.5 ppm) due to unreacted allyl alcohol ethoxylate is at a very low level (integral =0.04) as is the 1,2-propylene glycol methyl carbon resonance of incompletely allyl-end-capped oligomers (delta=19.99 ppm, —$OCH_2CH(OH)CH_3$, integral=0.05; reference as above). The formation of an A.T.E. ester composition is shown by $^{13}$C resonances at delta=135.5 ppm, integral=0.91, (—$CH_2$—$CH$=$CH_2$); and delta=116.0 ppm, integral=0.91, (—$CH_2$—$CH$=$CH_2$).

As noted here and throughout the specification, 13C n.m.r shifts in parts per million (p.p.m) are referred to tetramethylsilane (0 p.p.m) using hexadeuterated dimethylsulfoxide (DMSO-d$_6$) secondary reference for convenience. The crude product thus obtained is cooled to room temperature.

Step 3.

Reaction of the product of step 2 with sodium metabisulfite in water (radical-initiated sulfonation, azo initiator):

The A.T.E. product of step 2 (5.00, 0.00265 moles) is placed in a dry, suitably sized round bottom flask equipped with magnetic stirrer, fitted with a condenser and gas inlet and outlet. Distilled water (20, 1.11 moles) is added under an argon blanket. Sodium metabisulfite (0.554, 0.00291 moles, about 10% excess, Fisher) is added in water (5.0 ) and stirred to dissolution. A free radical initiator (2,2'-azobis(N,N'-dimethyleneisobutyramidine) dihydrochloride, VA-044 (TM) Waco Chemicals, 0.03, 0.0929 millimoles) is added. The mixture is heated with stirring to about 45° C. over about 30 minutes, the temperature being specifically selected to maintain solubility of the oligomer in the aqueous medium and to prevent visible phase separation. After a sulfonation reaction time of about 2.75 hrs, the temperature is increased to about 50° C. (The practitioner is careful with temperature control, using it to avoid undesirable solubility problems or visible phase separation from developing). Additional VA-044 (0.05, 0.155 millimoles) is added to the reaction mixture. Heating is continued for an additional sulfonation reaction time of about 19 hrs. Analysis at this stage shows the reaction to be about complete. The reaction mixture is filtered to remove traces of precipitate, and is transferred to a Kugelrohr apparatus, where it is heated under aspirator vacuum to a temperature of about 100° C. to remove water. The apparatus is then cooled and the tacky product is scraped out. The weighed o yield is 3.84 ; note that a substantial amount of material remains in the flask of the Kugelrohr and that, on reproducing the synthesis, yields are more typically near theory.

Analysis by IH n.m.r and $^{13}$C n.m.r spectroscopy is indicative of a high ( 85%-95% ) degree of sulfonation of the oligomer allyl moieties as inferred by disappearance of the $^1$H resonances at delta=5.85 ppm (—$CH_2$—$CH$=$CH_2$) and delta=5.18 ppm (—$CH_2CH$=$CH_2$) and the $^{13}$C resonances at delta=135.5 ppm (—$CH_2$—$CH$=$CH_2$) and delta=116.0 ppm (—$CH_2$—$CH$=$CH_2$) and further confirmed by the appearance of new resonances, particularly those in the $^{13}$C n.m.r spectrum at delta=25.0 ppm (—CH$_2$—CH$_2$—CH$_2$-(SO$_3$—), integral=0.75; delta=48.3 ppm (—CH$_2$—CH$_2$—CH$_2$(SO$_3$—), integral=0.75; delta=64.2 ppm (—CH$_2$—CH(SO$_2$—)—CH$_2$(SO$_3$—), integral=0.02; delta=44.6 ppm (—CH$_2$—CH(SO$_2$—)—CH$_2$(SO$_3$—), integral=0.02; delta=56.7 ppm (—CH$_2$—CH(SO$_3$—)—CH$_2$(SO$_3$—), integral=0.23; and delta=49.2 ppm (—CH$_2$—CH(SO$_3$—)—CH$_2$(SO$_3$—), integral=0.23. integrals are normalized based upon the sum of the terminal carbon atom resonances and as noted supra, $^1$H n.m.r data are referred to tetramethylsilane, delta =0 ppm.

EXAMPLE 2

Step 1:

Preparation of allyl alcohol ethoxylate having average degree of polymerization of about 11:

The following procedure is carried out in a fume hood; a trapping system is optionally used for additional reassurance in preventing escape of ethylene oxide vapors.

Allyl alcohol (100, 1.72 moles, 99+%, Aldrich) is placed in a suitably sized dry, three-necked round bottom flask fitted with magnetic stirrer, condenser and gas inlet and outlet. The flask and contents are cooled under a nitrogen atmosphere to about 0° C. Sodium metal shot (1.98, 0.086 moles, Aldrich) is added slowly under a countercurrent of nitrogen. The mixture is stirred for 1.5 hrs at about 0° C. (Other strong bases can equally be used in substitution for the sodium). The temperature is allowed to rise to room temperature, at which stage essentially no sodium metal remains visible. The stirred mixture is heated to reflux, at o which stage ethylene oxide gas is introduced into the solution through a glass tube at a rate at which it is mostly absorbed by the mixture rather than being wastefully expelled. Over a 6-hour period during which ethylene oxide addition is continued, the reflux temperature increases from about 100° C. to about 140° C. To avoid forming vinyl ether byproducts, the temperature during this procedure is in any event never permitted to exceed about 150° C. Completion of the reaction to an average degree of polymerization about 11 is confirmed by measuring volume uptake of ethylene oxide, measuring weight gain of the reaction mixture, or measuring both these quantities. The mixture is cooled to room temperature, and is treated with aqueous HCl (15 cm$^3$, $^1$M, Fisher). The product at this stage is neutral. Substantially all water present is removed under aspirator vacuum. The product is filtered to remove sodium chloride. Yield is 886, 1.63 moles. 1H n.m.r analysis using the method of Example 1 is consistent with the average degree of polymerization of about 11.

Step 2:

Reaction of the product of step 1 with dimethyl terephthalate and propylene glycol (two-stage procedure involving transesterification and oligomerization stages):

The product of step 1 (88.6, 0.163 moles) is placed in a dry, suitably sized round bottom flask equipped with magnetic stirrer, fitted with gas inlet, nitrogen bubbler and a modified Claisen head which supports a condenser and receiving flask. Dimethyl terephthalate (43.6, 0.225 moles, Aldrich), 1,2-propylene glycol (21.8, 0.286 moles, Mallinckrodt, 98%) and a conventional transesterification catalyst such as FASCAT 4100 (TM) M&T Chemicals Inc., 0.154 ; 0.1% w/w, are added under a nitrogen blanket. The mixture is stirred and heated to about 140° C. over a period of about 15-30 minutes. This temperature is maintained for about 1 hour. The temperature is now raised to about 70° C., taking about 15 minutes. During the following 18 hours, the transesterification is continued and methanol together with some propylene glycol (total 15.1 g, theory 14.4 ) distil from the reaction mixture.

The apparatus is then cooled to room temperature and the reaction mixture is transferred to a Kugelrohr apparatus. The Kugelrohr is maintained under vacuum (ca. 1 mmHg) and the temperature is raised to about 200° C. over a 1 hr. period. The reaction mixture is held at this temperature for a total oligomerization time of about 5 hrs. The product of the transesterification and oligomerization procedure is cooled to room temperature.

The reaction is demonstrated to be substantially complete by 270 MHz $^{13}$C n.m.r spectroscopy, giving results similar to those of Example 1, step 2 with the exception of the degree of polymerization which, as noted, is about 11.

The A.T.E product thus obtained is cooled to room temperature.

Step 3.

Reaction of the A.T.E product of step 2 with sodium metabisulfite in water (radical-initiated sulfonation, azo initiator):

The product of step 2 (100, 0.0635 moles) is placed in a dry, suitably sized round bottom flask equipped with magnetic stirrer, fitted with a condenser and gas inlet and outlet. Distilled water (200, moles) is added under an argon blanket. Sodium metabisulfite (10.58, 0.0557 moles, Fisher) is added in water (150 ) and stirred to dissolution. Nitrogen gas is bubbled through the solution for about 20 min. A free radical initiator (2,2 -azo-bis(N,N-dimethyleneisobutyramidine) dihydrochloride, VA-044 (TM) Waco Chemicals, 0.216, 0.668 millimoles, dissolved in about 60 of water) is added. The mixture is heated with stirring to about 35° C., taking about 30 minutes; the temperature being specifically selected to maintain solubility of the oligomer in the aqueous medium and to prevent visible phase separation. After a sulfonation reaction time at 35° C. of about 8 hrs, it is acceptable to increase the temperature. Thus, over about 30 minutes, the temperature is increased to about 45° C. (The practitioner remains careful with temperature control, using it to avoid undesirable solubility problems or visible phase separation from developing.) The sulfonation reaction is allowed to continue for an additional 8.9 hr period. The temperature is then increased yet again over about 30 minutes, to about 55° C., and the sulfonation reaction is allowed to continue for a further 30 hrs. Additional sodium metabisulfite (2.23, 0.0117 moles) and VA-044 (0.108, 0.334 millimoles) is added to the reaction mixture. Reaction at 55°-60° C. is continued for an additional sulfonation reaction time of about 26 hrs. Analysis at this stage shows the reaction to be about complete. The aqueous product solution (79% water) is filtered to remove traces of precipitate.

Analysis by $^1$H n.m.r. and $^{13}$C n.m.r. spectroscopy is indicative of a high (85%-95%) degree of sulfonation of the oligomer allyl moieties as inferred by disappearance of the $^1$H resonances at delta =5.85 ppm (—CH- $_2$—CH=CH$_2$) and delta =5.18 ppm (—CH$_2$CH=CH$_2$) and the $^{13}$C resonances at delta=135.5 ppm (—CH$_2$—CH=CH$_2$) and delta 116.0 ppm (—CH$_2$—CH=CH$_2$) and further confirmed by the appearance of new resonances, particularly those in the $^{13}$C n.m.r spectrum at delta=25.0 ppm (—CH$_2$—CH$_2$—CH$_2$-{SO$_3$—}), integral=0.75; delta=48.3 ppm (—CH$_2$—CH$_2$—CH$_2${SO$_3$—}), integral=0.75; delta=64.2 ppm CH$_2$—CH{{SO$_2$—}'CH$_2${SO$_3$—}), integral=0.15; delta=44.6 ppm (—CH$_2$—CH{{SO$_2$—})—CH$_2${SO$_3$—}), integral=0.15; delta=56.7 ppm (—CH$_2$—CH{{SO$_3$—})—CH$_2${SO$_3$—}), integral=0.10; and delta=49.2 ppm (—CH$_2$—CH(SO$_3$—)-CH2(SO$_3$—), integral==0.10. In the foregoing, the integral=s are normalized based upon the sum of the terminal carbon atom resonances and as noted supra, 1$_H$ n.m.r. data are referred to tetramethysilane, delta=0 ppm.

A sample of the aqueous A.T.E. product is titrated using standard iodometric methods; see "Basic Theory and Practice of Quantitative Chemical Analysis", R. B. Fischer and D. G. Peters, W. B. Saunders Co., West Washington Square, Philadelphia, PA, 3rd Edition, 1968, pages 571, 572, 584–590; incorporated herein by reference. The molarity of oxidizable sulfur-containing groups is 0.024M.

EXAMPLE 3

Peroxide oxidation of the product of Example 2:

To a sample of the aqueous A.T.E. product of Example 2 (350 cm$^3$) is added dropwise, at ambient temperature, aqueous hydrogen peroxide (5.7, 5%, 8.4 millimoles). The solution is reacted at 45° C. for about 30 min., and is then cooled to ambient temperature. A test using peroxide test paper (E.M. QUANT, 0-100 ppm range) is negative for peroxide.

The relevant $^{13}$C n.m.r data now obtained are as follows: delta=25.0 ppm (—CH$_2$—CH$_2$—CH$_2$-{SO$_3$—}), integral=0.75; delta=48.3 ppm (—CH$_2$—CH$_2$—CH$_2${SO$_3$—}), integral=0.75; delta=64.2 ppm (—CH$_2$—CH(SO$_2$—)—CH$_2${SO$_3$—}), integral=0.05; delta=44.6 ppm (—CH$_2$—CH-(SO$_2$—)—CH$_2${SO$_3$—}), integral=0.05; delta=56.7 ppm (—CH$_2$—CH{SO$_3$—}—CH$_2${SO$_3$—}), integral=0.2; and delta=49.2 ppm (—CH$_2$—CH{SO$_3$—})—CH$_2${SO$_3$—}), integral=0.2; the integrals=are normalized as noted in the Examples supra.

EXAMPLE 4

Radical initiated sulfonation of A.T.E using a redox initiator and sodium metabisulfite at low pH:

Allyl end-capped oligomeric ester, specifically that of Example 2, step 2 hereinabove (100 g, 0.0635 moles) is placed in a dry, suitably sized round bottom flask equipped with a magnetic stirrer, condenser and gas inlet and outlet. Distilled water (150 g) is added under a nitrogen blanket. Sodium metabisulfite (24.15 g, 0.127 moles, Aldrich) is added in water (310 g) and stirred to dissolution. Nitrogen gas is bubbled through the solution for about 30 minutes. The pH, as measured using a sensitive conventional pH paper, is about 4.5. The mixture is cooled in an ice bath to a temperature of about 5° C., at which time the pH is adjusted to about 2.0 using about 15 ml of 15% sulfuric acid. The mixture is removed from the ice bath, and is warmed to ambient temperature over about 1 hour. Sodium persulfate (0.605 g, 2.54 millimoles) is then added. Upon dissolution of the sodium persulfate, FeSO$_4$ in aqueous solution (2.0 ml, 0.013M) is added. After stirring for about 1.5 hrs at ambient temperature, residual bisulfite is determined by titration (see Example 2 for reference to the procedure) as being about 17% by weight of the amount originally added. Analysis at 2.0 hrs. indicates 13% residual bisulfite. At 2.5 hrs., additional FeSO$_4$ (2.0 ml, 0.013M) is added, and the reaction is allowed to continue for an additional 16 hrs. The residual bisulfite now measures about 8%. At this stage, the pH is about 2.1. The pH is raised to about 6.0 using about 10.0 ml of 5% aqueous NaOH. The total volume is about 560 ml (about 21% solids). Analysis by IH n.m.r (freeze-dried sample redissolved in DMSO d$_6$) is indicative of a high degree (85%-95%) of sulfonation of the oligomeric terminal allyl moieties, as inferred by the disappearance of the IH resonances at delta=5.85 ppm (—CH$_2$—CH CH2) and delta==5.18 ppm (—CH$_2$—CH=CH2) and the 13C resonances (solvent D$_2$O: DMSO d$_6$ 1:1 v/v) at delta=135.5 ppm (—CH$_2$—CH=CH$_2$) and delta=116.0 ppm (—CH$_2$—CH=CH$_2$). Formation of S.T.E. product wherein about 90% of the allyl end-caps at the ends of the ester oligomer have been converted to sulfinatesulfonate end-caps (CAP$_a$) is confirmed by integral=s of the new resonances, particularly those in the $^{13}$C n.m.r spectrum at delta==63.9 ppm (—CH$_2$—CH{SO$_2$—})—CH$_2${SO$_3$—}) and delta=45.2 ppm (—CH$_2$—CH(SO$_2$—)—CH$_2${SO$_3$—}).

EXAMPLE 5

Peroxide oxidation of the product of Example 4:

To a sample of the substantially clear aqueous S.T.E. product o obtained in Example 4 (280 ml, approximately 0.113M) is added dropwise, at ambient temperature, over 0.5 hrs., an aqueous solution of hydrogen peroxide (25 g, 10% v/v). The reaction mixture is stirred at ambient temperature overnight. The reaction mixture is then heated to about 50° C. over a period of about 0.5 hrs. and is maintained at 50° C. for about 1.0 hr. Analysis by $^{13}$C n.m.r. (D$_2$O: DMSO d$_6$ 1:1 v/v) is indicative of a high (about 90%) degree of conversion of the sulfinate-sulfonate end caps (CAP$_a$) to disulfonate end-caps CAP$_b$). Thus, the resonances at delta=63.9 ppm (—CH$_2$—CH{SO$_2$—})—CH$_2${SO$_3$—}) and delta=45.2 ppm (—CH$_2$—CH(SO$_2$—}) CH$_2${SO$_3$—}) disappear and are replaced by new resonances at delta=58.0 ppm (—CH$_2$—CH{SO$_3$—})—CH$_2${SO$_3$—}) and delta=49.3 ppm (—CH$_2$—CH{SO$_3$—})—CH$_2$-{SO$_3$—}).

Detergent Compositions

The soil release agents of the type described hereabove can be used to formulate detergent compositions in the form of powders, pastes, liquids, bars, gels, and the like. These compositions are particularly adapted for use in laundering all manner of fabrics, in the conventional manner. Detergent compositions prepared using the soil release agents herein will o generally comprise conventional detersive ingredients of the type well-known to those skilled in the art. Following are representative, but nonlimiting, examples of such conventional ingredients.

Surfactants - Detergent compositions typically contain from about 5% to about 50%, more preferably from about 10% to about 25%, by weight of detersive surfactants such as the $C_{11}$—$C_{13}$ alkylbenzene sulfonic acids, $C_{12}$—$C_{20}$ alpha-sulfonated fatty acids, $C_{12}$—$C_{20}$ alkyl polyethoxylated sulfonic acids, tallow alkyl sulfates, olefin sulfonates, and the like. Nonionic surfactants, typically, $C_{12}-C_{18}$ alkyl polyethoxylates containing from about 5 to about 15 ethylene oxide units, may also be employed. Amine oxides and the common soaps are also conventional. Various cationic surfactants can also be used. Mixtures of anionic and nonionic surfactants are quite commonly used in modern laundry detergent compositions to provide a balanced mix of clay and oily soil removal properties. Standard reference works, such as the o McCutcheon's Index, can be referred to for other types of conventional detersive surfactants which are typically employed in laundry compositions, and which can be employed with the soil release materials herein.

Builders Fully-formulated laundry detergent compositions will also typically contain from 5% to 60%, more typically 10% to 30%, by weight, of various detergency builder materials to sequester water hardness. Again, listings of typical builders can be had from standard texts and reference works. Included among such materials are the alkali metal phosphates, the alkali metal citrates, various polycarboxylate builders including the nitrilotriacetates, the water-soluble oxodisuccinate salts, and the water-soluble salts of tartrate mono- and di- succinate, as described in U.S. Pat. No. 4,663,071; May 5, 1987, the disclosures of which are incorporated herein by reference. These polycarboxylate builders are especially preferred for use in the formulation of low-phosphate detergent compositions. Other types of builder useful herein are the so-called precipitating builders and the zeolites, especially the 1-10 micron particle size Zeolite A detergency builders. The $C_{10}-C_{18}$ alkylsuccinates are also useful as builder materials, especially in heavy duty liquid compositions. As is extensively described in the patent literature, various mixtures of these builders can also be employed.

Enzymes - Various detersive enzymes can also be employed in detergent compositions in the manner well-known in the art. Included among such materials are the proteases (especially the alkaline proteases), amylases, lipases, and mixtures thereof. Typically, such enzymes will comprise from about 0.05% to about 0.2% by weight of detergent compositions.

Optional Adjuncts - Detergent compositions will also typically contain from 0.1% to 30%, by weight, of various conventional adjunct materials such as bleaches, especially perborate bleaches; bleach activators, such as tetraacetylethylenediamine; suds suppressors, such as various silicones and microcrystalline waxes; perfumes; pH adjusting agents; optical brighteners; and the like. Granular detergent compositions will typically contain solid carrier materials such as sodium sulfate. Liquid detergent compositions will typically comprise an aqueous or aqueous/alcohol carrier.

It is to be understood that the selection of the particular materials used in the preparation of detergent compositions can vary considerably, depending on the desires of the formulator.

The formulator will naturally recognize that the soil release agents of the invention are esters and are thus, by definition, potentially hydrolyzable materials, both during and after formulation into a detergent composition. However, they can simply and conveniently be protected against hydrolysis so that their performance as soil release agents is not substantially impaired by the process of formulation into a detergent composition.

Hydrolysis protection during formulation, as illustrated in a process for making preferred liquid, paste or gel-form detergent composition embodiments of the invention, need involve no more than the following simple expedient; any aggressively acidic or alkaline formula ingredients to be used are selected and blended together in the absence of the soil release agent so as to form an ingredient mixture having pH below about 11, more preferably in the range from about 4 to about 9.5; the soil release agent can now safely be added (see Example 6 hereinafter). In the alternative, preneutralized forms of otherwise hydrolysis-aggressive detergent ingredients can be used. As an additional precaution in making the liquid, gel or paste embodiments, it is preferred to keep formulation temperatures, within practical limits, on the low side (e.g., 20° C.-80° C.).

Hydrolysis protection after formulation, as illustrated in the preferred liquid, paste and gel-form detergent composition embodiments, is assured by maintaining the composition within the above-specified pH ranges. For processability of liquid compositions, it is convenient to have an alkanolamine, e.g., monoethanolamine (preferred) or diethanolamine, present at low levels, e.g., 0.1% by weight; for bleach compatibility reasons, levels above about 3% are preferably avoided.

When formulating bar, powder or granule forms of detergent compositions incorporating the soil release agents of the invention, the formulator will likewise generally avoid unnecessary prolonged direct exposure of the soil release agent, especially when hot, to hydrolysis-aggressive ingredients such as concentrated aqueous acids or concentrated aqueous bases. When formulating powder or granule, i.e., substantially dry forms of the detergent compositions, advantage can be taken of the fact that the dry forms of the soil release agents herein are relatively stable to hydrolysis. This is well illustrated by the fact that granular salts, even when alkaline (e.g., sodium tripolyphosphate), coated with the dry form of the soil release agents provided herein, provide an excellent vehicle for incorporating same into a granular detergent composition.

The following examples illustrate typical laundry detergent compositions which employ the soil release agents of the present invention at concentrations of from at least about 0.05%, typically up to about 3%, preferably about 0.3% to about 1%, by weight. In Examples 7 and 8, the abbreviation "TMS/TDS" refers to the tartrate monosuccinate/tartrate disuccinate builder prepared in the manner described in U.S. Pat. No. 4,663,071, above.

EXAMPLE 6

A heavy duty liquid composition of the present invention is as follows:

| Component | Active Weight % |
|---|---|
| $C_{13}$ linear alkylbenzene sulfonic acid | 4.40 |
| $C_{11.8}$ linear alkylbenzene sulfonic acid | 4.40 |
| $C_{14-15}$ alkyl polyethoxylate (2.25) sulfonic acid | 8.80 |
| $C_{12-13}$ alkyl polyethoxylate (6.5)* | 3.52 |
| $C_{12}$ alkyl trimethyl ammonium chloride | 0.53 |
| Sodium cumene sulfonate | 3.15 |
| Ethanol | 1.23 |
| 1,2 Propanediol | 3.00 |
| Brightener | 0.114 |
| Monoethanolamine | 1.63 |
| Potassium hydroxide | 1.00 |
| Sodium hydroxide | 2.88 |
| $C_{12-14}$ fatty acid | 3.08 |
| Citric acid | 3.52 |
| Sodium formate | 0.78 |
| Calcium formate | 0.11 |

-continued

| Component | Active Weight % |
|---|---|
| Tetraethylene pentamine ethoxylate (15-18) | 1.54 |
| Water | 54.666 |
| Soil release agent** | 0.50 |
| Dye | 0.08 |
| Perfume | 0.25 |
| Protease*** | 0.82 |

*Alcohol and monoethoxylated alcohol removed
**Mixed anionic ester oligomers according to Example 1
***mg active enzyme/g (@ 40 mg active enzyme/g stock)

The ingredients listed above are added to a mixing tank with a single agitator in the order which they appear below. Before addition of dye, perfume, and proteolytic enzyme, the pH of the mixture is adjusted such that a 10% by weight solution in water has a pH of about 8.5.

| Stock Material | Weight Percent |
|---|---|
| Alkyl polyethoxylate paste mixture | 17.60 |
| $C_{14}$ alkyl polyethoxylate (2.25) sulfonic acid | 50.00 |
| Ethanol 40-b | 7.00 |
| Sodium hydroxide | 6.00 |
| 1,2 Propanediol | 12.25 |
| Water | 24.75 |
| Sodium cumene sulfonate (45%) | 5.45 |
| Ethanol (92%) | 1.34 |
| 1,2 Propanediol | 0.85 |
| Brightener premix | 4.11 |
| Brightener | 2.76 |
| Monoethanolamine | 7.69 |
| $C_{12-13}$ alcohol polyethoxylate (6.5)* | 38.50 |
| Water | 51.05 |
| $C_{12-13}$ alcohol polyethoxylate (6.5)* | 1.94 |
| Monoethanolamine | 1.31 |
| Potassium hydroxide (45%) | 2.22 |
| Sodium hydroxide (50%) | 3.65 |
| $C_{13}$ linear alkyl benzene sulfonic acid (96%) | 4.58 |
| $C_{11.8}$ linear alkyl benzene sulfonic acid (97%) | 4.53 |
| $C_{12-14}$ fatty acid | 3.08 |
| Citric acid | 6.59 |
| Tartrate succinates (39.0%) | 9.03 |
| Sodium formate (30%) | 1.90 |
| Calcium formate (10%) | 1.06 |
| $C_{12}$ alkyl trimethylammonium chloride (37%) | 1.43 |
| Tetraethylene pentamine ethoxylate (15-18) (80%) | 1.93 |
| Water | 25.34 |
| Soil release agent | 1.10 |
| Dye | 0.08 |
| Perfume | 0.25 |
| Protease** | 0.82 |

*Alcohol and monoethoxylated alcohol removed
**mg active enzyme/g (@ 40 mg active enzyme/g stock)

The above formula is clear, stable, and homogeneous.

EXAMPLE 7

A granular detergent composition for household laundry use is as follows:

| Component | Weight Percent |
|---|---|
| Sodium $C_{14}-C_{15}$ alkylsulfate | 13.3 |
| Sodium $C_{13}$ linear alkyl benzene sulfonate | 5.7 |
| $C_{12}-C_{13}$ alkylpolyethoxylate (6.5) | 1.0 |
| Sodium toluene sulfonate | 1.0 |
| TMS/TDS sodium salt (86/14 wt. ratio) | 25.0 |
| Sodium N-hydroxyethylethylenediaminetriacetate | 2.0 |
| Soil-release agent* | 0.9 |
| Sodium carbonate | 20.3 |
| Sodium silicate | 5.8 |
| Polyethylene glycol (Avg. M.W. approx. 8000) | 1.0 |
| Sodium sulfate, water and miscellaneous | Balance to 100% |

*Oligomers according to Example 2

The components other than the Soil Release Agent are added together with continuous mixing with sufficient extra water (about 0% total) to form an aqueous slurry which is then spray dried; the Soil Release Agent is then admixed in dry form to complete the composition.

In the composition of Example 7, the following substitutions can be made:
(a) for TMS/TDS:
(1) an equivalent amount of TMS alone, and
(2) an equivalent amount of TDS alone.

EXAMPLE 8

A liquid detergent composition for household laundry use is prepared by mixing the following ingredients:

| Component | Weight Percent |
|---|---|
| $C_{13}$ alkylbenzenesulfonic acid | 10.5 |
| Triethanolamine cocoalkyl sulfate | 4.0 |
| $C_{14-15}$ alcohol ethoxy-7 | 12.0 |
| $C_{12-18}$ alkyl monocarboxylic acids | 15.0 |
| TMS/TDS triethanolamine salt (85/15 TMS/TDS) | 5.0 |
| Diethylenetriaminepentakis (methylenephosphonic acid) | 0.8 |
| Soil release agent* | 1.5 |
| Triethanolamine | 2.5 |
| Ethanol | 8.6 |
| 1,2-propanediol | 3.0 |
| Water, perfume, buffers and miscellaneous | Balance to 100% |

*Oligomers according to Example 3

EXAMPLE 9

The composition of Example 8 is prepared, but with the substitution of an equivalent amount of sodium 2,2,-oxodisuccinate for the TMS/TDS.

What is claimed is:

1. A sulfonated oligomeric ester composition comprising the sulfonated product of a preformed, substantially linear ester oligomer, said linear ester oligomer comprising, per mole,
(a) 2 moles of terminal units wherein from about 1 mole to about 2 moles of said terminal units are derived from an olefinically unsaturated component selected from the group consisting of allyl alcohol and methallyl alcohol, and any remaining of said terminal units are other units of said linear ester oligomer;
(b) from about 1 mole to about 4 moles of nonionic hydrophile units, said hydrophile units being derived from alkylene oxides, said alkylene oxides comprising from about 50% to 100% ethylene oxide;
(c) from about 1.1 moles to about 20 moles of repeat units derived from an aryldicarbonyl component, wherein said aryldicarbonyl component is comprised of from about 50% to 100% dimethylterephthalate, whereby the repeat units derived from said dimethylterephthalate are terephthaloyl; and (d) from about 0.1 moles to about 19 moles of repeat units derived from a diol component selected from the group consisting of $C_2$—, $C_3$— and $C_4$ glycols; wherein the extent of sulfonation of said sulfonated oligomeric ester composition is such that said terminal units are chemically modified by (e) from about 1 mole to about 4 moles of terminal unit substituent groups of formula —$SO_xM$ wherein x is 2 or 3, said terminal unit substituent groups being derived from a bisulfite component selected from the group consisting of $HSO_3M$ wherein M is a conventional water-soluble cation.

2. A sulfonated oligomeric ester composition according to claim 1 wherein said terminal units of (a) are derived from an olefinically unsaturated component consisting essentially of allyl alcohol; said nonionic hydrophile units of (b) have an average degree of polymerization of from about 4 to about 30 and are derived from an ether component consisting essentially of ethylene oxide; and said repeat units of (c) are derived from a mixture of an aryldicarbonyl component comprised of from about 80% to about 100% dimethylterephthalate; and said diol component of (d) consists essentially of a mixture of ethylene glycol and 1,2-propylene glycol wherein the ethylene glycol: 1,2-propylene glycol mole ratio is in the range from 0:1 to about 0.9:0.1.

3. A sulfonated oligomeric ester composition according to claim 2 wherein said nonionic hydrophile units (b) have an average degree of polymerization of from about 8 to about 20 and wherein the units (d), the ethylene glycol: 1,2-propylene glycol mole ratio is in the range from 0:1 to about 0.4:0.6.

4. A sulfonated oligomeric ester composition according to claim 2 which is further characterized in that it comprises the product of a process comprising: in an ester-bond forming procedure, a transesterification step, comprising reacting a mixture of
(I) about 2 moles of allyl alcohol ethoxylated to an average degree of polymerization of from about 8 to about 20; and
(II) from about 2 to about 7 moles of dimethyl terephthalate; and
(III) from about 2 to about 14 moles of 1,2-propylene glycol or mixture thereof with ethylene glycol;

wherein the transesterification step is carried out in the presence of a conventional transesterification catalyst; at a transesterification temperature in the range from about 120° C. to about 250° C., at a transesterification pressure in the range from about 0.75 atm. to about 3 atm., for a transesterification time of from about 2 hrs. to about 60 hrs.; followed by an oligomerization step, comprising further reacting said mixture at an oligomerization temperature in the range from about 170° C. to about 250° C., at an oligomerization pressure in the range from about $1 \times 10^{-6}$ atm. to about 0.5 atm., for an oligomerization time of from about 2 hrs. to about 60 hrs.; whereby an allyl end-capped co-oligomeric ester precursor is produced;
followed by a radical-initiated olefin sulfonation procedure.

5. A sulfonated oligomeric ester composition according to claim 4, wherein said radical-initiated olefin sulfonation procedure comprises:

at least one step of sulfonating said allyl end-capped co-oligomeric ester precursor, in the presence of water, with a low temperature, free-radical sulfonation initiator and a conventional bisulfite sulfonating reagent; wherein the reactants are effectively cocontacted in an aqueous reaction mixture and wherein the level of said conventional bisulfite sulfonating agent is from about 1 mole to about 4 moles per mole of said allyl end-capped co-oligomeric ester precursor and wherein the following sulfonation conditions are respected:
sulfonation temperature: in the range from about 0° C. to about 100° C.; sulfonation pressure: in the range from about 0.5 atm. to about 3 atm., and sulfonation time period: from about 0.1 hrs. to about 90 hrs.

6. A sulfonated oligomeric ester composition according to claim 5, wherein said transesterification temperature is in the range from about 160° C. to about 230° C.; said transesterification pressure is in the range from about 1 atm. to about 2 atm.; said transesterification time is in the range from about 5 hrs. to about 25 hrs.; said oligomerization temperature is in the range from about 180° C. to about 220° C.; said oligomerization pressure is in the range from about $1 \times 10^{-4}$ atm. to about 0.05 atm.; and said oligomerization time is in the range from about 5 hrs. to about 25 hrs.

7. A sulfonated oligomeric ester composition according to claim 6, wherein the low temperature free-radical sulfonation initiator is selected from azo initiators and redox initiators, and wherein the following sulfonation conditions are respected when using the azo initiator:
sulfonation temperature: in the range from about 40° C. to about 65° C.; sulfonation pressure: in the range from about 1 atm. to about 3 atm.; and sulfonation time period: from about 10 hrs. to about 30 hrs.; and wherein the following conditions are used with the redox initiator: sulfonation temperature 0° C. to 40° C.; sulfonation pressure 0.5–3 atm; sulfonation time: 0.1–24 hrs.

8. A sulfonated oligomeric ester composition according to claim 6, wherein the process comprises the additional step of treating the sulfonated product with hydrogen peroxide.

9. In a process for preparing sulfonated ester compositions useful as functional materials in detergent compositions, said process comprising at least one ester-bond forming procedure and at least one sulfonation procedure, the improvement whereby a particular terminally sulfonated, substantially linear co-oligomeric ester composition is secured without reliance upon a chlorinated compound and without reliance upon a procedure comprising a sulfonation step followed by an ethoxylation step; which improvement comprises the ordered sequence of:

(a) in an ester-bond forming procedure, a transesterification step, comprising reacting a mixture of
(I) about 2 moles of allyl alcohol ethoxylated to an average degree of polymerization of from about 8 to about 20; together with
(II) from about 2 to about 7 moles of dimethyl terephthalate; and
(III) from about 2 to about 14 moles of a $C_2$–$C_4$ glycol; in the presence of a conventional transesterification catalyst; at a transesterification temperature in the range from about 120° C. to about 250° C., at a transesterification pressure in the range from about 0.75 atm. to about 3 atm. and for a transesterification time of from about 2 hrs. to about 60 hrs.; followed by an oligomerization step comprising further reacting said mixture at an oligomerization temperature in the range from about 170° C. to about 250° C., at an oligomerization pressure in the range from about $1 \times 10^{-6}$ atm. to about 0.5 atm., and for an oligomerization time of from about 2 hrs. to about 60 hrs.; thereby producing an allyl endcapped co-oligomeric ester precursor; and (b) in a radical-initiated olefin sulfonation procedure, at least one step of sulfonating said allyl endcapped co-oligomeric ester precursor, in the presence of water, with a low temperature, free-radical sulfonation initiator and a conventional bisulfite sulfonating reagent; wherein the reactants are effectively cocontacted in an aqueous reaction mixture and wherein the level of said conventional bisulfite sulfonating agent is from about 1 mole to about 4 moles per mole of said allyl end-capped co-oligomeric ester precursor and wherein the following sulfonation conditions are respected:

sulfonation temperature: in the range from about 0° C. to about 100° C.; sulfonation pressure: in the range from about 0.5 atm. to about 3 atm.; and sulfonation time period: from about 0.1 hrs. to about 90 hrs.

10. A sulfonated oligomeric ester composition, in a sodium salt form, consisting essentially of:

(i) a substantially linear oligomeric ester backbone, which is comprised of terephthaloyl and oxyalkyleneoxy repeat units, wherein from about 85% to 100% by weight of said backbone is comprised of terephthaloyl and oxy-1,2-propyleneoxy repeat units; and (ii) terminal moieties covalently attached to said backbone, wherein said terminal moieties are derived from compounds selected from the group consisting of allyl alcohol ethoxylate, dimethylterephthalate, and 1,2-propylene diol, provided that from about 70% to 100% of said terminal moieties are selected from the group consisting of:

—($E_n$)—($CH_2$—$CH\{SO_3N_a\}$—$CH_2\{SO_3Na\}$),

—($E_n$)—($CH_2$—$CH\{SO_2Na\}$—$CH_2\{SO_3Na\}$), and

—($E_n$)—($CH_2$—$CH_2$—$CH_2\{SO_3Na\}$);

wherein ($E_n$) is poly(oxyethylene)oxy and n is in the range from about 8 to about 20; and wherein said composition comprises from about 5% to about 40%, by weight, of end-cap moieties —($CH_2$—$CH\{SO_3Na\}$—$CH_2\{SO_3Na\}$), —($CH_2$—$CH\{SO_2N_a\}$)—$CH_2(SO_3Na)$) and —($CH_2$—$CH_2$—$CH_2(SO_3$-$N_a\}$).

11. The sodium salt form of a sulfonated oligomeric ester according to claim 10, wherein the percentage by weight of the end-cap moieties —($CH_2$—$CH\{SO_3$-$Na\}$—$CH_2\{SO_3Na\}$), —($CH_2$—$CH\{SO_2Na\}$—$CH_2$-$\{SO_3Na\}$) and —($CH_2$—$CH_2$—$CH_2\{SO_3Na\}$) is in the range from about 10% to about 30%.

12. The sodium salt form of a sulfonated oligomeric ester according to claim 10, wherein the mole ratio of the doubly sulfonated end-cap moieties: —($CH_2$—$CH$-$\{SO_3Na\}$—$CH_2\{SO_3Na\}$) and —($CH_2$—$CH\{SO_2Na\}$)—$CH_2\{SO_3Na\}$) in relation to the singly sulfonated end-cap moieties: —($CH_2$—$CH_2$—$CH_2\{SO_3Na\}$), is in the range from 1:5 to about 1:0.

13. The sodium salt form of a sulfonated oligomeric ester according to claim 10, wherein the mole ratio of the doubly sulfonated end-cap moieties: —($CH_2$—$CH$-$\{SO_3Na\}$—$CH_2\{SO_3Na\}$) and —($CH_2$—$CH\{SO_2$-$Na\}$—$CH_2\{SO_3Na\}$), in relation to the singly sulfonated end-cap moieties: —($CH_2$—$CH_2$—$CH_2\{SO_3$-$Na\}$), is in the range from about 2:1 to about 1:0.

14. A detergent composition, comprising at least about 0.05% by weight of the composition of claim 1.

15. A built laundry detergent according to claim 14, comprising from about 5% to about 50% by weight of detersive surfactant and from about 5% to about 60% by weight of detergency builder.

16. A composition according to claim 15 wherein the builder is a member selected from the group consisting of polycarboxylate builders, zeolite builders, phosphate builders, and mixtures thereof.

17. A composition according to claim 16 wherein the builder is selected from oxodisuccinate salts, tartrate monosuccinate salts, tartrate disuccinate salts, and mixtures thereof.

* * * * *

UNITED STATES PATENT AND TRADEMARK OFFICE
CERTIFICATE OF CORRECTION

PATENT NO. : 4,968,451

DATED : November 6, 1990

INVENTOR(S) : Jeffrey J. Scheibel, Eugene P. Gosselink

It is certified that error appears in the above-identified patent and that said Letters Patent is hereby corrected as shown below:

Column 1, line 60, "soil o release" should be --soil release--.

Column 2, line 3, "textile o treatments" should be --textile treatments--.

Column 2, line 34, "have o nonionic" should be --have nonionic--.

Column 2, line 68, after "useful", add --syntheses of the soil-releasing ester oligomer compositions.--.

Column 3, line 16, "&he" should be --the--.

Column 4, line 14, "$R_3$" should be --$R^3$--.

Column 4, line 15, "$R_2$" should be --$R^2$--.

Column 4, line 22, "$R_3$" should be --$R^3$--.

Column 4, line 30, "$(R_2)(R_3)$" should be --$(R^2)(R^3)$--.

Column 4, line 37, "i%" should be --is--.

Column 5, line 4, ". o Duddey" should be --. Duddey--.

Column 6, line 1, "(CAPb)" should be --$(CAP_b)$--.

Column 6, line 12, "(CAPa)" should be --$(CAP_a)$--.

Column 6, line 13, "(CAPb)" should be --$(CAP_b)$--.

Column 6, line 14, "(CAPc)" should be --$(CAP_c)$--.

Column 6, line 23, "homoloq" should be --homolog--.

Column 8, line 5, "(B)" should be --{B}--.

Column 8, line 65, "he" should be --the--.

Column 9, line 14, "are o illustrated" should be --are illustrated--.

UNITED STATES PATENT AND TRADEMARK OFFICE
CERTIFICATE OF CORRECTION

PATENT NO. : 4,968,451
DATED : November 6, 1990
INVENTOR(S) : Jeffrey J. Scheibel, Eugene P. Gosselink It is certified that error appears in the above-identified patent and that said Letters Patent is hereby corrected as shown below:

Column 9, line 43, "groups o are" should be --groups are--.
Column 10, line 4, "( $CAP_b$ )" should be -- ( $CAP_b$ )--.
Column 10, line 26, "· $CAP_b$ )" should be -- · ( $CAP_b$ )--.
Column 10, line 31, " $CAP_b$ )" should be -- . ( $CAP_b$ )--.
Column 10, line 32, "end-cap n moieties" should be --end-cap moieties--.
Column 10, line 42, "The is" should be --The synthesis is--.
Column 11, line 25, "with o a" should be --with a--.
Column 11, line 36, "is water o" should be --is water--.
Column 11, line 49, "amidinoo propane" should be --amidinopropane--.
Column 12, line 7, "&he" should be --the--.
Column 12, line 16, "aboveoutlined" should be --above-outlined--.
Column 12, line 21 "pH o effects" should be --pH effects--.
Column 12, line 25, "$CAP_b$)" should be --($CAP_b$)--.
Column 12, line 28, "$CAP_b$)" should be --($CAP_b$)--.
Column 12, line 55, "1 atm 760" should be --1 atm. = 760--.
Column 14, line 58, "(8.72," should be --(8.72 g,--.
Column 14, line 63, "(0.17," should be --(0.17 g,--.
Column 14, line 64, "stirred 1.5" should be --stirred for 1.5--.
Column 15, line 15, "1M" should be --1M--.
Column 15, line 19, "77.8 (" should be --77.8 g (--.
Column 15, line 44, "(19.1," should be --(19.1 g,--.
Column 15, line 49, "(7.00," should be --(7.00 g,--.

UNITED STATES PATENT AND TRADEMARK OFFICE
CERTIFICATE OF CORRECTION

PATENT NO. : 4,968,451
DATED : November 6, 1990
INVENTOR(S) : Jeffrey J. Scheibel, Eugene P. Gosselink It is certified that error appears in the above-identified patent and that said Letters Patent is hereby corrected as shown below:

Column 15, line 50, "(3.40," should be --(3.40 g,--.

Column 15, line 52, "0.03;" should be --0.03 g;--.

Column 15, line 54, "40°C" should be --140°C--.

Column 15, line 65, "lmmHg" should be --1mmHg--.

Column 16, line 4, "70 MHz 13°C." should be --270 MHz $^{13}$C--.

Column 16, line 5, "(delta" should be --(delta = --.

Column 16, line 6-7, "$CH_2=CHCH_2O\ (CH_2CH_2O)_x-ICH_2CH_2OH$" should be --$CH_2=CHCH_2O(CH_2CH_2O)_{x-1}CH_2CH_2OH$--.

Column 16, line 17, "13C" should be --$^{13}$C--.

Column 16, line 20, "secondary" should be --as secondary--.

Column 16, line 29, "5.00," should be --5.00 g--.

Column 16, line 32, "(20," should be --(20 g,--.

Column 16, line 34, "0.554," should be --0.554 g--.

Column 16, line 35, "(5.0)" should be --(5.0 g)--.

Column 16, line 38, "0.03," should be --0.03 g--.

Column 16, line 47, "(0.05," should be --(0.05 g,--.

Column 16, line 56, "weighed o yield" should be --weighed yield--.

Column 16, line 57, "3.84;" should be --3.84 g;--.

Column 16, line 60, "lH" should be --$^1$H--.

Column 17, line 1-2, "$(-CH_2-CH_2-CH_2(SO_3^-)$" should be --$(-CH_2-CH_2-CH_2\{SO_3^-\})$--.

Column 17, line 2-3, "$(-CH_2-CH_2-CH_2(SO_3^-)$" should be --$(-CH_2-CH_2-CH_2\{SO_3^-\})$--.

UNITED STATES PATENT AND TRADEMARK OFFICE
CERTIFICATE OF CORRECTION

PATENT NO. : 4,968,451

DATED : November 6, 1990

INVENTOR(S) : Jeffrey J. Scheibel, Eugene P. Gosselink

It is certified that error appears in the above-identified patent and that said Letters Patent is hereby corrected as shown below:

Column 17, line 4, "$(-CH_2-CH(SO_2)-CH_2(SO_3^-)$" should be --$(-CH_2-CH\{SO_2^-\}-CH_2\{SO_3^-\})$--.

Column 17, line 5, "$(-CH_2-CH(SO_2^-)-CH_2(SO_3^-)$" should be --$(-CH_2-CH\{SO_2^-\}-CH_2\{SO_3^-\})$--.

Column 17, line 6, "$(-CH_2-CH(SO_3^-)-CH_2(SO_3^-)$" should be --$(-CH_2-CH\{SO_3^-\}-CH_2\{SO_3^-\})$--.

Column 17, line 8, "$(-CH_2-CH(SO_3^-)-CH_2(SO_3^-)$" should be --$(-CH_2-CH\{SO_3^-\}-CH_2\{SO_3^-\})$--.

Column 17, line 9, "0.23. integrals" should be --0.23. In the foregoing, the integrals--.

Column 17, line 23, "100," should be --100 g,--.

Column 17, line 28, "1.98," should be --1.98 g,--.

Column 17, line 34, "at o which" should be --at which--.

Column 17, line 44, "polymerization about" should be --polymerization of about --.

Column 17, line 48, "$^1M$" should be --1M--.

Column 17, line 52, "886," should be --886 g,--.

Column 17, line 52, "1H" should be --$^1H$--.

Column 17, line 61, "88.6," should be --88.6 g,--.

Column 17, line 66, 43.6," should be --43.6 g,--.

Column 18, line 1, "0.154;" should be --0.154 g;--.

Column 18, line 5, "70°C" should be --170°C--.

UNITED STATES PATENT AND TRADEMARK OFFICE
CERTIFICATE OF CORRECTION

PATENT NO. : 4,968,451

DATED : November 6, 1990

INVENTOR(S) : Jeffrey J. Scheibel, Eugene P. Gosselink

It is certified that error appears in the above-identified patent and that said Letters Patent is hereby corrected as shown below:

Column 18, line 9, "14.4)" should be --14.4 g)--.

Column 18, line 32, "100," should be --100 g,--.

Column 18, line 35, "(200, moles" should be --(200 g, 11.1 moles--.

Column 18, line 36, "10.58," should be --10.58 g,--.

Column 18, line 37, "(150)" should be --(150 g)--.

Column 18, line 41, "0.216," should be --0.216 g,--.

Column 18, line 42, "60 of" should be --60 g of--.

Column 18, line 58, "2.23," should be --2.23 g,--.

Column 19, line 7-8, "$CH_2-CH_2-CH_2-CH_2\{SO_3-\})$" should be --$CH_2-CH_2-CH_2\{SO_3-\})$ Column 19, line 9, "inlegral" should be --integral--.

Column 19, line 10-11, "$(-CH_2-CH\{\{SO_2-\})-CH_2\{SO_3-\})$" should be --$(-CH_2CH\{SO_2^-\}-CH_2\{SO_3-\})$--.

Column 19, line 12, "$(-CH_2-CH\{\{SO_3-\})-CH_2\{SO_3-\})$" should be --$(-CH_2-CH\{SO_3-\}-CH_2\{SO_3-\})$--.

Column 19, line 13-14, "$(-CH_2-CH(SO_3-)CH_2(SO_3-)$" should be --$(-CH_2CH\{SO_3-\}-CH_2\{SO_3^-\})$--.

Column 19, line 15, "integral=s are" should be --integrals are--.

Column 19, line 32, "5.7," should be --5.7 g,--.

Column 19, line 33, "at 45°C" should be --at about 45°C--.

Column 19, line 45-46, "$(-CH_2-CH\{SO_3\})-CH_2\{SO_3-\})$" should be --$(-CH_2-CH\{SO_3^-\}-CH_2\{SO_3-\})$--.

UNITED STATES PATENT AND TRADEMARK OFFICE
CERTIFICATE OF CORRECTION

PATENT NO. : 4,968,451
DATED : November 6, 1990
INVENTOR(S) : Jeffrey J. Scheibel, Eugene P. Gosselink It is certified that error appears in the above-identified patent and that said Letters Patent is hereby corrected as shown below:

Column 19, line 46, "integrals=are" should be --integrals are--.

Column 20, line 12, "IH" should be --$^1$H--.

Column 20, line 16, "IH" should be --$^1$H--.

Column 20, line 16-17, "(-CH$_2$-CHCH2) and delta ==" should be --(-CH$_2$-CH=CH$_2$) and delta =--.

Column 20, line 18, "13C" should be --$^{13}$C--.

Column 20, line 20, "Formation of" should be --Formation of an--.

Column 20, line 24, "sulfinatesulfonate" should be --sulfinate-sulfonate--.

Column 20, line 25, "integral=s" should be --integrals--.

Column 20, line 26, "(-CH$_2$-CH{SO$_2$-})-CH$_2${SO$_3$-})" should be --(-CH$_2$-CH{SO$_2$-}-CH$_2${SO$_3$-})--.

Column 20, line 28, "(-CH$_2$-GH(SO$_2$-)-CH$_2${SO$_3$-})" should be --(-CH$_2$-CH{SO$_2$-}-CH$_2${SO$_3$-}).

Column 20, line 33, "product o obtained" should be --product obtained--.

Column 20, line 43, "CAP$_b$)" should be --(CAP$_b$)--.

Column 20, line 44, "(-CH$_2$-CH{SO$_2$-})-CH$_2${SO$_3$-})" should be --(-CH$_2$-CH{SO$_2$-}-CH$_2${SO$_3$-})--.

Column 20, line 45, "(-CH$_2$-CH{SO$_2$-})-CH$_2${SO$_3$-})" should be --(-CH$_2$-CH{SO$_2$-}-CH$_2${SO$_3$-})--.

Column 20, line 47, "(-CH$_2$-CH{SO$_3$-})-CH$_2${SO$_3$-})" should be --(-CH$_2$-CH{SO$_3$-}-CH$_2${SO$_3$-})--.

UNITED STATES PATENT AND TRADEMARK OFFICE
CERTIFICATE OF CORRECTION

Page 7 of 7

PATENT NO. : 4,968,451

DATED : November 6, 1990

INVENTOR(S) : Jeffrey J. Scheibel, Eugene P. Gosselink

It is certified that error appears in the above-identified patent and that said Letters Patent is hereby corrected as shown below:

Column 20, line 48-49, "(-CH$_2$-CH{SO$_3$-})-CH$_2${SO$_3$-})" should be --(-CH$_2$-CH{SO$_3$-}-CH$_2${SO$_3$-})--.

Column 20, line 59, "will o generally" should be --will generally--.

Column 21, line 11, "the o McCutcheon's" should be --the McCutcheon's--.

Column 21, line 15, "Builders Fully-formulated" should be --Builders - Fully-formulated--.

Column 24, line 10, "0%" should be --40%--.

Column 18, line 58, "0.108" should be --0.108 g,--.

Column 28, line 8-9, "(CH$_2$-CH{SO$_2$N$_a$})-CH$_2$(SO$_3$Na})" should be --(CH$_2$-CH{SO$_2$Na}-CH$_2$(SO$_3$Na})--.

Column 28, line 9-10, "-(CH$_2$-CH$_2$-CH$_2$(SO$_3$N$_a$})" should be --(CH$_2$-CH$_2$-CH$_2${SO$_3$Na})--.

Signed and Sealed this

Eighteenth Day of August, 1992

Attest:

DOUGLAS B. COMER

*Attesting Officer*     *Acting Commissioner of Patents and Trademarks*